United States Patent
Hung et al.

(10) Patent No.: US 8,618,756 B2
(45) Date of Patent: Dec. 31, 2013

(54) SYSTEMS AND METHOD FOR CONTROLLING ELECTRIC MOTORS

(75) Inventors: Tsai-Wang Hung, New Taipei (TW); Hsin-Ming Su, Zhubei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 2 days.

(21) Appl. No.: 13/477,248

(22) Filed: May 22, 2012

(65) Prior Publication Data

US 2013/0154528 A1    Jun. 20, 2013

(30) Foreign Application Priority Data

Dec. 19, 2011    (TW) .............................. 100147162 A

(51) Int. Cl.
H02P 6/16    (2006.01)

(52) U.S. Cl.
USPC ................. 318/400.07; 318/700; 318/400.04; 318/437

(58) Field of Classification Search
USPC .................. 318/700, 400.01, 400.04, 400.07, 318/400.2, 722, 432, 437
See application file for complete search history.

(56) References Cited

U.S. PATENT DOCUMENTS

| | | | |
|---|---|---|---|
| 5,883,484 A * | 3/1999 | Akao | 318/700 |
| 6,462,491 B1 * | 10/2002 | Iijima et al. | 318/400.34 |
| 6,492,789 B2 | 12/2002 | Cheng | |
| 7,034,493 B2 | 4/2006 | Yoshimoto et al. | |
| 7,304,452 B2 * | 12/2007 | Nagai et al. | 318/811 |
| 7,986,116 B2 * | 7/2011 | Imura et al. | 318/400.15 |
| 8,390,223 B2 * | 3/2013 | Nakamura et al. | 318/400.01 |
| 2003/0169015 A1 | 9/2003 | Royak et al. | |
| 2004/0195993 A1 | 10/2004 | Yoshimoto et al. | |
| 2005/0151678 A1 | 7/2005 | Bilinskis et al. | |
| 2010/0164428 A1 | 7/2010 | Xu et al. | |
| 2011/0221382 A1 | 9/2011 | Hayashi | |

FOREIGN PATENT DOCUMENTS

| | | |
|---|---|---|
| CN | 1469542 A | 1/2004 |
| CN | 1783692 A | 6/2006 |
| CN | 1941606 A | 4/2007 |
| JP | 2009-124869 | 6/2009 |

(Continued)

OTHER PUBLICATIONS

Halkosaari et al., "Optimal U/F-Control of High Speed Permanent Magnet Motors", IEEE ISIE 2006, Jul. 9-12, 2006; Montreal, Quebec, Canada; pp. 2303-2308.

(Continued)

*Primary Examiner* — Bentsu Ro
*Assistant Examiner* — Thai Dinh
(74) *Attorney, Agent, or Firm* — Finnegan, Henderson, Farabow, Garrett & Dunner, LLP

(57) ABSTRACT

A method for controlling a permanent magnet synchronous motor is disclosed. The method comprises receiving a feedback current from a motor; generating a digital current signal based on the feedback current, the digital current signal indicative of a value of the feedback current; generating a power signal and a first imaginary power signal based on the digital current signal and a three-phase voltage signal; receiving a speed signal indicative of an expected speed of the motor; generating a phase signal based on the speed signal and the power signal; generating a voltage signal based on the speed signal, the power signal, and the first imaginary power signal; and adjusting the three-phase voltage signal for driving the motor based on the voltage signal and the phase signal.

20 Claims, 11 Drawing Sheets

(56) References Cited

FOREIGN PATENT DOCUMENTS

| | | |
|---|---|---|
| JP | 2009-124870 | 6/2009 |
| JP | 2009-124871 | 6/2009 |
| JP | 2009-124872 | 6/2009 |
| TW | I229493 | 3/2005 |
| TW | 200603516 | 1/2006 |
| TW | I315602 | 6/2006 |
| TW | 200631300 | 9/2006 |

OTHER PUBLICATIONS

Itoh et al., "A Comparison Between V/f Control and Position-Sensorless Vector Control for the Permanent Magnet Synchronous Motor", in proceedings of Power Conversion Conference 2002 (IEEE), vol. 3, Apr. 2-5, 2002, pp. 1310-1315.

Mademlis et al., "Loss Minimization in Vector-Controlled Interior Permanent-Magnet Synchronous Motor Drives", IEEE Transactions on Industrial Electronics, vol. 49, No. 6, Dec. 2002, pp. 1344-1347.

Perera et al., "A Sensorless, Stable V/f Control Method for Permanent-Magnet Synchronous Motor Drives", IEEE Transactions on Industrial Applications, vol. 1, No. 3, 2003, pp. 783-791.

Ancuti et al., "Sensorless V/f Control of High-Speed Surface Permanent Magnet Synchronous Motor Drives with Two Novel Stabilising Loops for Fast Dynamics and Robustness", IET Electronic Power Applications, vol. 4, No. 3, 2010, pp. 149-157.

Zhao et al., "Design of an Optimal V/f Control for a Super High Speed Permanent Magnet Synchronous Motor", The 30$^{th}$ Annual Conference of the IEEE Industrial Electronics Society, Nov. 2-6, 2004, Busan, Korea, pp. 2260-2263.

Sue et al., "A New MTPA Control Strategy for Sensorless V/f Controlled PMSM Drives", The 6$^{th}$ IEEE Conference on Industrial Electronics and Applications, 2011, pp. 1834-1838.

* cited by examiner

US 8,618,756 B2

SYSTEMS AND METHOD FOR CONTROLLING ELECTRIC MOTORS

RELATED APPLICATIONS

This application claims the benefit of priority from Taiwanese Application No. 100147162, filed Dec. 19, 2011.

TECHNICAL FIELD

This disclosure relates to systems and methods for controlling electric motors.

BACKGROUND

Electric motors and their control systems commonly used for, such as, various mechanical, industrial, automobile applications. Example of those applications, especially for involving variable frequency drive for electric motors, include hybrid vehicles and variable speed applications for appliances and HVAC (e.g., heating, ventilation, and air conditioning) systems. As an illustrative example, many conventional electric motor control systems use induction-type, synchronous motors and open-loop voltage/frequency (V/Hz) control techniques to control motors. Due to efficiency considerations, more and more permanent magnet synchronous motors (PMSMs) are replacing induction-type, synchronous motors in various applications. Compared to induction motors, PMSMs are also capable of providing higher power density with a smaller size.

In PMSM systems, conventional open-loop voltage/frequency control techniques may be inferior, because they tend to cause unstable vibrations, which may be caused by the small damping between the rotor and the stator of the PMSMs.

Therefore, it may be desirable to provide alternative control systems and methods for controlling PMSMs.

SUMMARY

In one embodiment, a method for controlling a permanent magnet synchronous motor is disclosed. The method comprises receiving a feedback current from a motor; generating a digital current signal based on the feedback current, the digital current signal indicative of a value of the feedback current; generating a power signal and a first imaginary power signal based on the digital current signal and a three-phase voltage signal; receiving a speed signal indicative of an expected speed of the motor; generating a phase signal based on the speed signal and the power signal; generating a voltage signal based on the speed signal, the power signal, and the first imaginary power signal; and adjusting the three-phase voltage signal for driving the motor based on the voltage signal and the phase signal.

In another embodiment, an apparatus for controlling a permanent magnet synchronous motor is disclosed. The apparatus comprises an analog-to-digital converter configured to receive a feedback current from a motor and convert the feedback current to a digital current signal; a first power computation unit, implemented by a processor, coupled to the analog-to-digital converter for receiving the digital current signal and configured to generate a power signal and a first imaginary power signal based on the digital current signal and a three-phase voltage signal; a speed setting unit, implemented by a processor, configured to generated a speed signal based on an expected angular speed of the motor; a phase computation unit, implemented by a processor, coupled to the speed setting unit and the first power computation unit for receiving the speed signal and the power signal and configured to generate a phase signal based on the speed signal and the power signal; a voltage computation unit, implemented by a processor, coupled to the speed setting unit and the first power computation unit for receiving the speed signal, the power signal, and the first imaginary power signal and configured to generate a voltage signal based on the speed signal, the power signal, and the first imaginary power signal; and a drive signal generator, implemented by a processor, coupled to the voltage computation unit and the phase computation unit for receiving the voltage signal and the phase signal and configured to generate a three-phase voltage signal based on the voltage signal and the phase signal.

In still another embodiment, a non-transitory computer-readable medium is disclosed. The non-transitory computer-readable medium includes instructions stored thereon. The instructions, when executed by a processor, cause the processor to carry out a method for controlling a permanent magnet synchronous motor as described herein.

It is to be understood that both the foregoing general description and the following detailed description are exemplary only and are not restrictive of the claimed subject matter.

BRIEF DESCRIPTION OF THE DRAWINGS

The accompanying drawings, which are incorporated in and constitute a part of this specification, illustrate embodiments consistent with the disclosed embodiments and, together with the description, serve to explain the principles of the disclosed embodiments.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosed embodiments. Instead, they are merely examples of systems and methods consistent with aspects related to the disclosed embodiments as recited in the appended claims.

A permanent magnet synchronous motor (PMSM) generally falls in one of two categories, depending on how the permanent magnet is mounted to a rotor of the motor. A surface-mounted PMSM utilizes permanent magnets which are mounted on the surface of the rotor. This makes the motor appear magnetically "round," and the motor torque is a result of a reactive force between the magnets on the rotor and the electromagnets of the stator. An interior PMSM has magnets that are buried inside of the rotor structure. As a result, the radial flux is more concentrated at certain spatial angles than it is at others. This gives rise to an additional torque component called reluctance torque, which is caused by the change of motor inductance along the concentrated and non-concentrated flux paths. Compared with surface-mounted PMSMs, interior PMSMs can produce higher power output for a given frame size.

Figure 1:
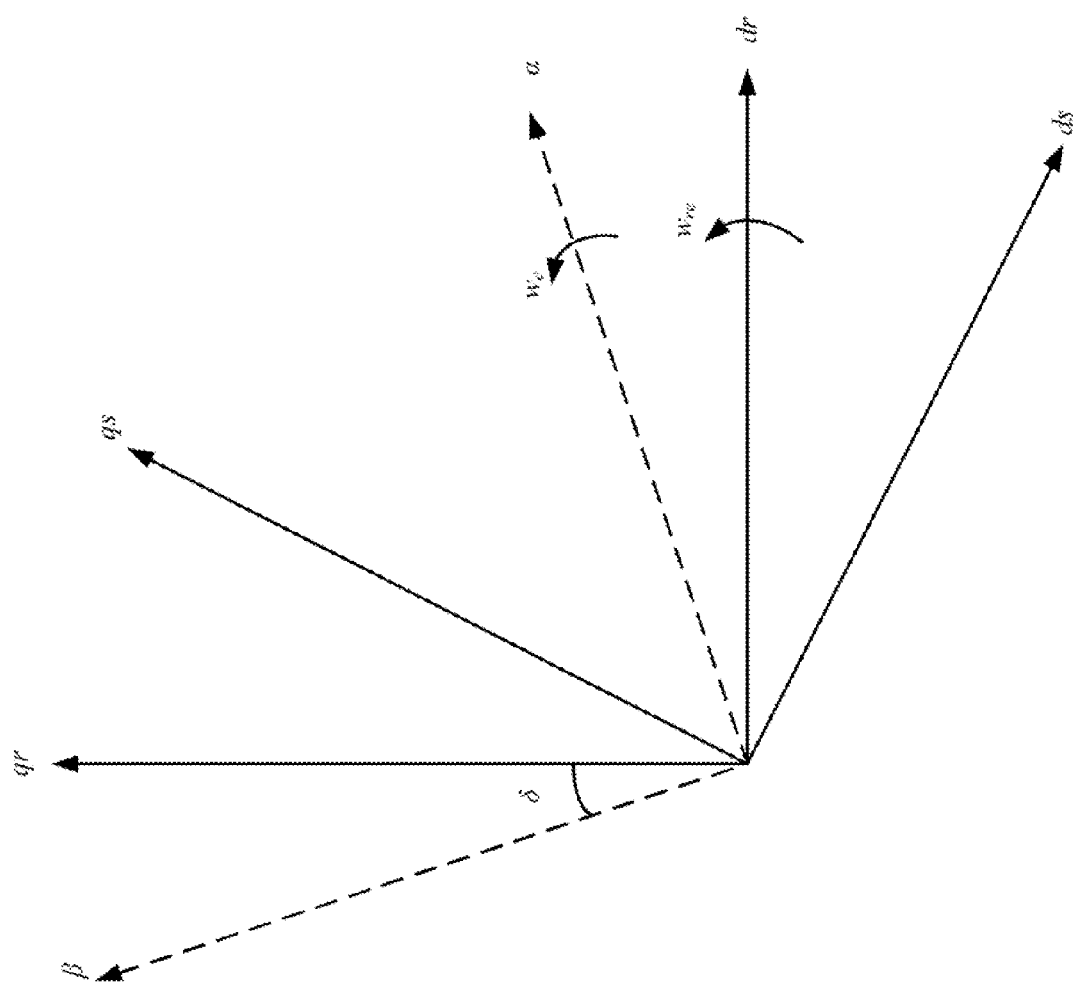
FIG. 1 illustrates a vector model representing the operation of an electric motor.

Generally, operation of an electric motor can be modeled by rotations of coordinate systems. As shown in FIG. 1, for example, a vector model of an electric motor includes a ds-qs coordinate system associated with the stator of the electric motor, a dr-qr coordinate system associated with the rotor of the electric motor, and an α-β coordinate system representing an electrical power, such as a three-phase voltage signal, applied to the stator of the electric motor. In the dr-qr coordinate system, the dr axis is along the main flux of the permanent magnet, representing the direct axis of the rotor. The qr axis is along the back electromotive force (i.e., back emf), representing the quadrature axis of the rotor. In the α-β coordinate system, the α axis is perpendicular to the applied voltage vector, and the β axis is along the applied voltage vector. The ds-qs coordinate system is stationary with respect to a global reference, while the dr-qr coordinate system rotates with the rotor at an angular speed of $w_{re}$. The α/β coordinate system of the applied voltage rotates at an angular speed of $w_{re}$. The angle between the dr-qr coordinate system and the α/β coordinate system is called the load angle δ. For a PMSM operating in a stable condition, the angular speed $w_e$ of applied voltage is the same as the rotor angular speed $w_{re}$, such that the load angle δ is unchanged under a constant load torque and speed condition. During a transient condition or an unstable operation, however, the load angle δ changes over time.

The embodiments described herein provide control methods and apparatuses for controlling both surface-mounted PMSMs and interior PMSMs to achieve stable and high performance operations and to improve operational efficiency of the motors. According to one embodiment, a control apparatus is provided to generate a feedback loop to stabilize the load angle δ of the electric motor. The control apparatus receives an input from a user or an external control circuit, which specifies an expected angular speed for an electric motor. In addition, the control apparatus receives a feedback signal from the electric motor. Based on the expected angular speed and the feedback signal, the control apparatus calculates a control signal for controlling the operation of the electric motor. According to a further embodiment, the control apparatus includes a controller for calculating the control signal.

According to another embodiment, the control apparatus disclosed herein implements control methods to ensure that the PMSM operates in substantially a minimum copper loss condition. Specifically, during the operation of the motor, a portion of the input power is dissipated by the resistance of the winding in the motor. These dissipated energy is called copper loss. The copper loss causes the power output on an output shaft of the electric motor to be less than the input electrical power, thereby constituting a waste of energy. According to the control methods disclosed herein, the control apparatus generates control signals to substantially minimize the copper loss of the electric motor in various operational conditions.

Figure 2:
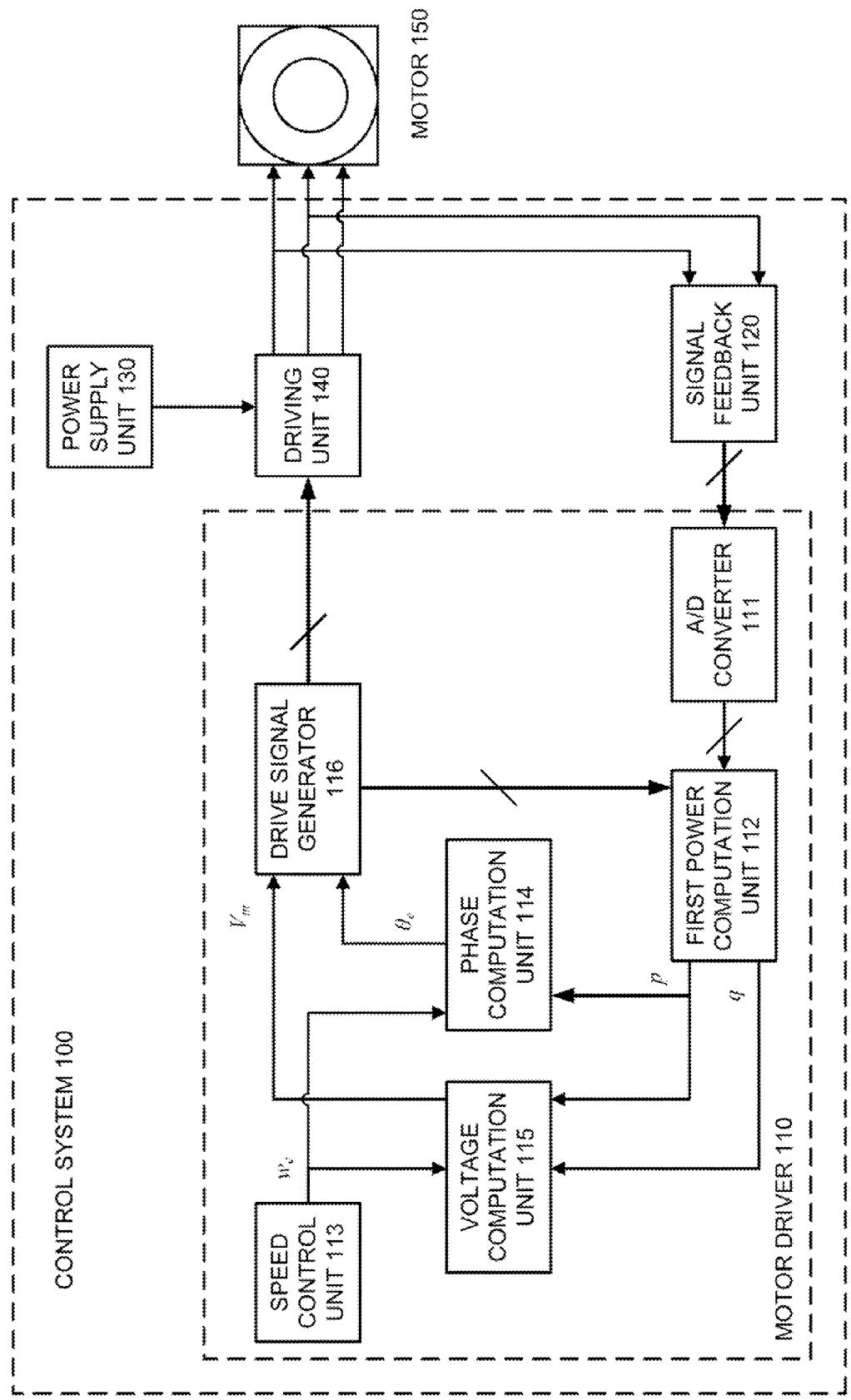
FIG. 2 illustrates a block diagram of a control apparatus for controlling a permanent magnet synchronous motor, according to an exemplary embodiment.

FIG. 2 illustrates a diagram of a control system 100 for controlling an electric motor 150, according to one embodiment of the disclosure. Electric motor 150 may be a surface-mounted PMSM or an interior PMSM as discussed above. According to a further embodiment, electric motor 150 receives power input through three-phase power input lines from control system 100. Accordingly, the three-phase power input lines carry a three-phase electrical signal including three components on respective input lines.

Control system 100 includes a motor driver 110, a signal feedback unit 120, a power supply unit 130, and a driving unit 140. Motor driver 110 further includes an analog-to-digital (A/D) converter 111, a first power computation unit 112, a speed control unit 113, a phase computation unit 114, a voltage computation unit 115, and a drive signal generator 116.

Signal feedback unit 120 receives a line signal from electric motor 150 and generates a feedback signal. The line signal may be sensed by the signal feedback unit 120 and collected from the input lines of electric motor 150, as shown in FIG. 2. The feedback signal generated by signal feedback unit 120 includes one or more analog line currents, which carry information about the operations of motor 150. For example, the feedback signal includes analog line currents $I_A$, $I_B$, and $I_C$ collected from the three respective input lines of motor 150. Alternatively, the feedback signal includes only one or two of the analog line currents $I_A$, $I_B$, and $I_C$.

A/D converter 111 is coupled to signal feedback unit 120 and receives the feedback signal from signal feedback unit 120. A/D converter 111 converts the feedback signal into a digital current signal. ND converter 111 may take various forms, such as a direct-conversion ND converter, a ramp-compare A/D converter, a Wilkinson A/D converter, an integrating ND converter, etc. The digital current signal may include a digital form of the analog line current signals $I_A$, $I_B$, and $I_C$.

First power computation unit 112 is coupled to A/D converter 111 and receives the digital current signal. First power computation unit 112 is also coupled to control signal generator 116 and receives a digital voltage signal from there. According to one embodiment, the digital voltage signal received from control signal generator 116 includes three-phase voltage signals $V_A$, $V_B$, and $V_C$. Alternatively, the digital voltage signal received from control signal generator 116 includes only one or two of the three-phase voltage signals $V_A$, $V_B$, and $V_C$.

After receiving the signals, first power computation unit 112 performs a pre-processing on the digital current signal and the digital voltage signal. According to one embodiment, the pre-processing includes a data conversion procedure. Specifically, first power computation unit 112 converts the three-phase signals, including three-phase current signals $I_A$, $I_B$, and $I_C$ and three-phase voltage signals $V_A$, $V_B$, and $V_C$ to stator ds-qs coordinate signals. The ds-qs coordinate signals include a ds-axis voltage signal $V_{ds}$, a qs-axis voltage signal $V_{qs}$, a ds-axis current signal $i_{ds}$, and a qs-axis current signal $i_{qs}$. First power computation unit 112 converts the three-phase signals based on following formulas:

$$V_{ds} = V_A,$$

$$V_{qs} = \left(\frac{1}{\sqrt{3}}\right)(V_B - V_C),$$

$$i_{ds} = I_A,$$

and $$i_{qs} = \left(\frac{1}{\sqrt{3}}\right)(I_B - I_C).$$

In the electric motor system depicted in FIG. 2, the electric power of the system takes a form of complex power, including a real power component and an imaginary (also known as reactive) power component. The real power and the imaginary power may be modeled by two perpendicular vectors on a complex plane. Based on the ds-qs coordinate signals, first power computation unit 112 further computes a power signal p and an imaginary power signal q according to the following formulas:

$$p = \left(\frac{3}{2}\right)(V_{ds}i_{ds} + V_{qs}i_{qs}), \quad (1)$$

$$q = \left(\frac{3}{2}\right)(V_{qs}i_{ds} - V_{ds}i_{qs}). \quad (2)$$

Thereafter, first power computation unit 112 outputs the power signal p and the imaginary power signal q to phase computation unit 114 and voltage computation unit 115.

Speed control unit 113 generates a speed signal $w_e$ indicating an expected angular speed of motor 150. According to one embodiment, speed control unit 113 generates the speed signal $w_e$ based on a user input. Speed control unit 113 provides a user interface through a display device for the user to input or specify the expected angular speed. Alternatively, speed control unit 113 may receive a control signal from an external control system or program and generate the speed signal $w_e$ based on the control signal. Specifically, speed control unit 113 includes a circuit interface or program interface to receive the control signal from the external control system or program.

Phase computation unit 114 is coupled to speed control unit 113 and first power computation unit 112 to receive the speed signal $w_e$ and the power signal p. Based on the received signals, phase computation unit 114 generates a phase signal $\theta_e$. Voltage computation unit 115 is also coupled to speed control unit 113 and first power computation unit 112 and receives the speed signal $w_e$, the power signal p, and the imaginary power signal q from there. Based on the received signals, voltage computation unit 115 generates a voltage signal $V_m$. Phase computation unit 114 and voltage computation unit 115 will be further described below.

Drive signal generator 116 is coupled to phase computation unit 114 and voltage computation unit 115 and receives the phase signal $\theta_e$ and the voltage signal $V_m$ therefrom. Based on the phase signal $\theta_e$ and the voltage signal $V_m$, drive signal generator 116 generates the three-phase voltage signals (i.e., $V_A$, $V_B$, and $V_C$) and outputs the three-phase voltage signals to first power computation unit 112 as described above. In addition, drive signal generator 116 outputs the three-phase voltage signals to driving unit 140, which is powered by power supply unit 130. Power supply unit 130 may provide a direct current (DC) power or an alternating current (AC) power.

Based on the three-phase voltage signals from drive signal generator 116 and the power signal from power supply unit 130, driving unit 40 generates a driving signal to control motor 150, thereby causing motor 150 to operate at the expected angular speed and to achieve substantially the minimum copper loss.

Figure 3:
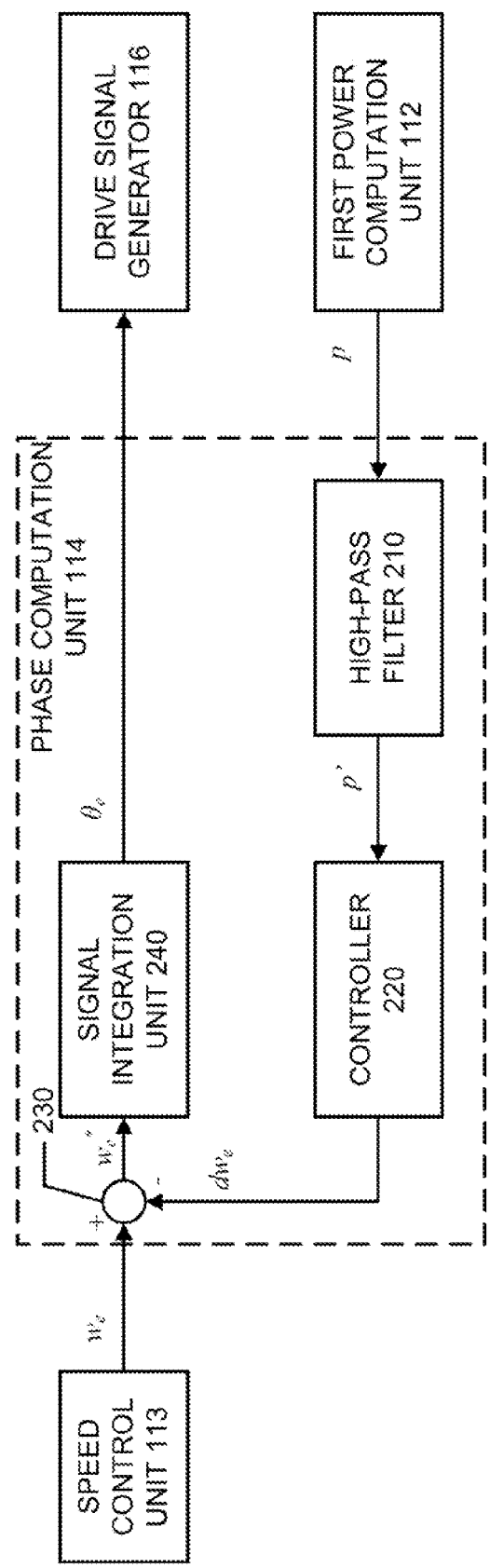
FIG. 3 illustrates a block diagram of the phase computation unit of FIG. 2, according to an exemplary embodiment.

FIG. 3 illustrates a diagram of phase computation unit 114 of FIG. 2, according to one embodiment. Phase computation unit 114 includes a high-pass filter 210, a controller 220, a signal subtraction unit 230, and a signal integration unit 240. High-pass filter 210 receives the power signal p from first power computation unit 112 and generates a high-pass filtered power signal p' by high-pass filtering the power signal p. Accordingly, the high-pass filtered power signal p' carries high frequency components of the power signal p, which include information of the angular speed of motor 150. For example, the high-pass filtered power signal p' is proportional to a difference between a current speed of motor 150 and the expected angular speed $w_e$. The cut-off frequency of high-pass filter 210 may be fixed or adjusted based on the line current signals collected on the input lines of motor 150.

Controller 220 is coupled to high-pass filter 210 and receives the high-pass filtered power signal p'. Controller 220 generates a speed adjustment signal $dw_e$ based on the high-pass filtered power signal p'. According to an embodiment, controller 220 is a proportional controller and generates the speed adjustment signal $dw_e$ by multiplying the high-pass filtered power signal p' with a constant, which may be determined inverse-proportionally to the angular speed $w_e$.

Subtraction unit 230 is coupled to speed control unit 113 and controller 220 to receive the speed signal $w_e$ and the speed adjustment signal $dw_e$. Subtraction unit 230 generates a speed signal $w_e^*$ by subtracting the speed adjustment signal $dw_e$ from the speed signal $w_e$.

Signal integration unit 240 is coupled to subtraction unit 230 and receives the speed signal $w_e^*$ from there. Signal integration unit 240 generates the phase signal $\theta_e$ by integrating the speed signal $w_e^*$ over time.

Figure 4:
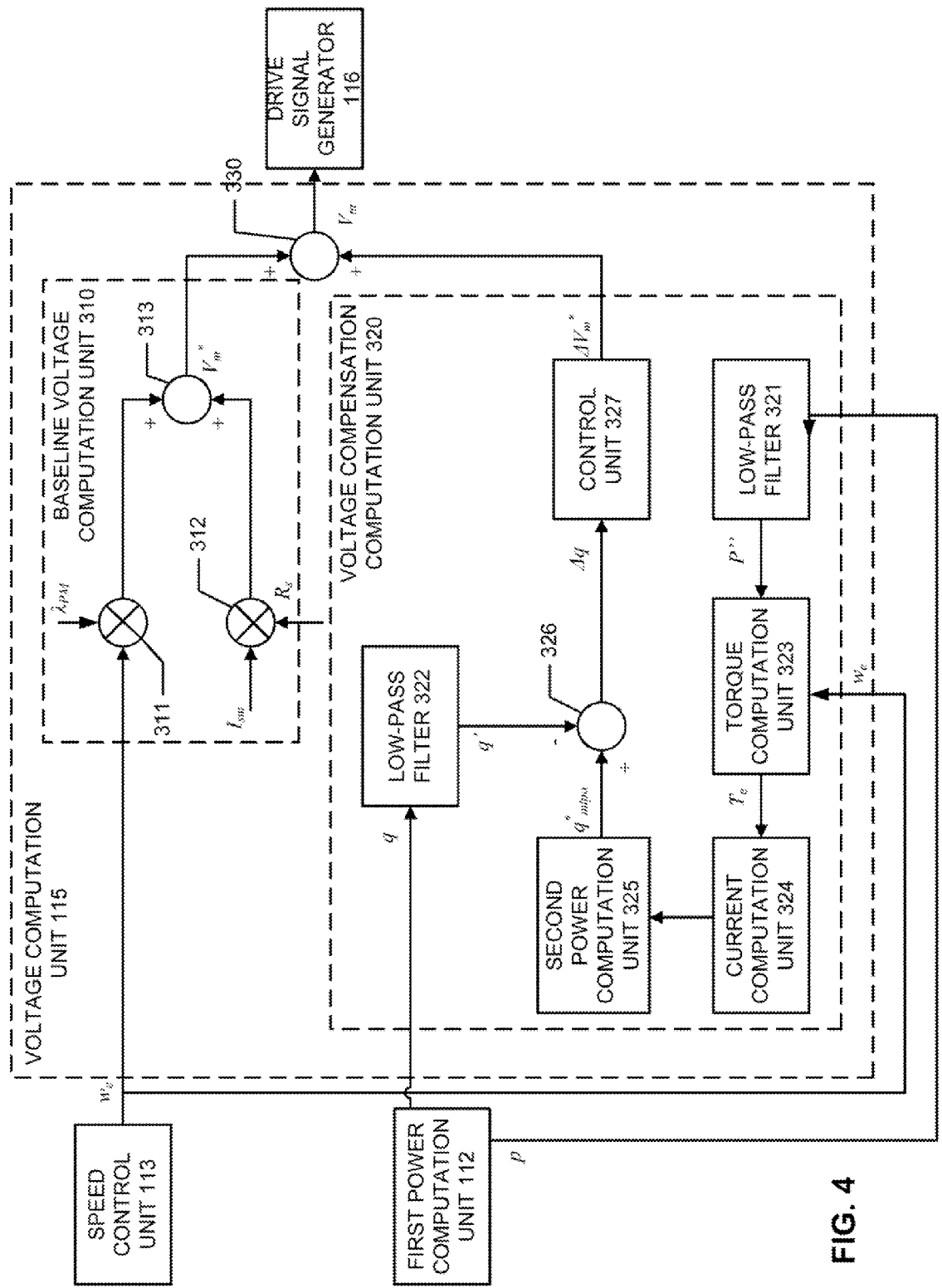
FIG. 4 illustrates a block diagram of the voltage computation unit of FIG. 2, according to an exemplary embodiment.

FIG. 4 illustrates a diagram of voltage computation unit 115 of FIG. 2. Voltage computation unit 115 includes a baseline voltage computation unit 310, a voltage compensation computation unit 320, and a summation unit 330. Baseline voltage computation unit 310 is coupled to speed control unit 113 and receives the speed signal $w_e$ from there. In addition, baseline voltage computation unit 310 receives motor parameters including a maximum line current amplitude $I_{sm}$, the motor winding resistance value $R_s$, and the permanent magnetic flux value $\lambda_{PM}$. Based on the received signals and parameters, baseline voltage computation unit 310 calculates a baseline voltage signal $V_m^*$. In one embodiment, the motor parameters, including the maximum line current amplitude $I_{sm}$, the motor winding resistance value $R_s$, and the permanent magnetic flux value $\lambda_{PM}$, may be determined by a user based on motor factory data and pre-stored within motor driver 110. For example, the maximum line current amplitude $I_{sm}$ is set to the maximum line current value $I_{smax}$ as specified by the motor factory data, and the motor winding resistance value $R_s$ and the permanent magnetic flux value $\lambda_{PM}$ may be similarly provided by the motor factor data. Alternatively, the motor parameters may be measured from motor 150 under operating conditions.

According to a further embodiment, baseline voltage computation unit 310 includes multiplication units 311 and 312 and a summation unit 313. Multiplication unit 311 is coupled to speed control unit 113 and receives the speed signal $w_e$ from there. Multiplication unit 311 then generates a first voltage component by multiplying the expected angular speed $w_e$ with the permanent magnetic flux value $\lambda_{PM}$. Multiplication unit 312 receives the maximum line current amplitude $I_{sm}$ and the motor winding resistance value $R_s$ and generates a second voltage component by multiplying the maximum line current amplitude $I_{sm}$ and the motor winding resistance value $R_s$.

Summation unit 313 is coupled to multiplication units 311 and 312 and receives the first voltage component and the second voltage component. Summation unit 313 generates the baseline voltage signal $V_m^*$ by summing the first voltage component and the second voltage component. As a result, the baseline voltage signal $V_m^*$ is generated by baseline voltage computation unit 310 according to the following formula, $$V_m^* = I_{sm} R_s + w_e \lambda_{PM}.$$

Voltage compensation computation unit 320 is coupled to first power computation unit 112 and receives the power signal p and the imaginary power signal q therefrom. Based on the received signals, voltage compensation computation unit 320 generates a voltage compensation signal $\Delta V_m^*$.

According to a further embodiment as shown in FIG. 4, voltage compensation computation unit 320 includes low-pass filters 321 and 322, a torque computation unit 323, a current computation unit 324, a second power computation unit 325, a subtraction unit 326, and a control unit 327. Low-pass filter 321 receives the power signal p from first power computation unit 112 and generates a low-pass filtered power signal p" by low-pass filtering the power signal p.

Torque computation unit 323 is coupled to speed control unit 113 and low-pass filter 312 and receives the speed signal $w_e$ and the low-pass filtered power signal p". Based on the received signals, torque computation unit 323 calculates a torque signal $T_e$ according to the following formula, $$T_e = \frac{p''}{w_e}.$$

Current computation unit 324 receives the torque signal $T_e$ and generates a second dr-axis current $i_{ds2}$ and a second qr-axis current $i_{qs2}$. According to one embodiment, current computation unit 324 calculates the second dr-axis current $i_{ds2}$ and second qr-axis current $i_{qs2}$ by solving the following formulas, $$(L_d - L_q)^3 i_{ds2}^4 + 3\lambda_{PM}(L_d - L_q)^2 i_{ds2}^3 + \tag{3}$$
$$3\lambda_{PM}^2 (L_d - L_q) i_{ds2}^2 + \lambda_{PM}^3 i_{ds2} - \frac{16}{9P^2}(L_d - L_q) T_e^2 = 0,$$

$$9P^2(L_d - L_q)^2 i_{qs2}^4 + 12 P T_e \lambda_{PM} i_{qs2} - 16 T_e^2 = 0, \tag{4}$$

where P is the number of magnetic poles of motor 150, $L_d$ and $L_q$ are the respective inductances along the dr axis and the qr axis. The second dr axis current $i_{ds2}$ and the second qr axis current $i_{qs2}$ calculated above correspond to an operating condition of motor 150 with a minimum copper loss at the expected angular speed $w_e$.

Second power computation unit 325 receives the second dr axis current $i_{ds2}$ and the second qr axis current $i_{qs2}$ from current computation unit 324 and generates a second imaginary power signal $q_{mtpa}^*$. According to one embodiment, second power computation unit 325 calculates the second imaginary power signal $q_{mtpa}^*$ by utilizing the following formula, $$q_{mtpa}^* = \frac{3}{2} \omega_e (L_q i_{ds2}^2 + L_d i_{qs2}^2). \tag{5}$$

The second imaginary power signal $q_{mtpa}^*$ calculated above corresponds to the operating condition of motor 150 with the minimum copper loss at the expected angular speed $w_e$.

Low-pass filter 322 receives the imaginary power signal q from the first power computation unit 112 and low-pass filters the imaginary power signal q to generate a low-pass filtered first imaginary power signal q'. Subtraction unit 326 receives the low-pass filtered imaginary power signal q' and the second imaginary signal $q_{mtpa}^*$ and subtracts the former from the latter to generate a power compensation signal $\Delta q$. Control unit 327 receives the power compensation signal $\Delta q$ from subtraction unit 326 and generates the voltage compensation signal $\Delta V_m^*$. According to one embodiment, control unit 327 may be a proportional controller, a proportional-integral controller, or other appropriate controllers. Control parameters of control unit 327 may be set according to the expected angular speed $w_e$.

Summation unit 330 receives the baseline voltage signal $V_m^*$ from summation unit 310 and receives the voltage compensation signal $\Delta V_m^*$ from control unit 327. Summary unit 330 generates the voltage signal $V_m$ by summing the baseline voltage signal $V_m^*$ and the voltage compensation signal $\Delta V_m^*$.

According to another embodiment, calculations of the second dr axis current $i_{ds2}$ and the second qr axis current $i_{qs2}$ are simplified when the dr axis inductance $L_d$ is equal to the qr axis inductance $L_q$. Specifically, current computation unit 324 calculates the second dr axis current $i_{ds2}$ and the second qr axis current $i_{qs2}$ according to the following formulas, $$i_{ds2} = 0, \tag{6}$$

$$i_{qs2} = \frac{4T_e}{3PT_e \lambda_{PM}}. \tag{7}$$

In addition, second power computation unit 325 calculates the second imaginary power signal $q_{mtpa}^*$ according to the following formula, $$q_{mtpa}^* = \frac{3}{2} \omega_o L_q i_{qs2}^2. \tag{8}$$

As discussed above, motor 150 may be an interior PMSM or a surface-mounted PMSM. When motor 150 is an interior PMSM, the dr axis inductance $L_d$ and the qr axis inductance $L_q$ are unequal. As a result, the second dr axis current $i_{ds2}$, the second qr axis current $i_{qs2}$, and the second imaginary power $q_{mtpa}^*$ are calculated according to formulas (3), (4), and (5).

When motor 150 is a surface-mounted PMSM, the dr axis inductance $L_d$ and the qr axis inductance $L_q$ are equal. As a result, the second dr axis current $i_{ds2}$, the second qr axis current $i_{qs2}$, and the second imaginary power $q_{mtpa}^*$ are calculated according to formulas (6), (7), and (8).

According to a still further embodiment, driving unit 140 includes a driver interface circuit and a three-phase inverter. The driver interface circuit generates a control signal from the three-phase voltage signals received from drive signal generator 116 and controls a power transistor in the three-phase inverter. By turning the power transistor on or off, the three-phase inverter converts the electrical power from power supply 130 into the driving signal supplied to motor 150. Because the driving signal is generated based on signals corresponding to the minimum copper loss condition, the driving signal causes motor 150 to operate in substantially the minimum copper loss condition at the expected angular speed.

Control system 100 discussed above may be implemented in one or more integrated circuits known in the art. For example, the circuit components may be fabricated in a single integrated circuit or distributed in a plurality of integrated circuits connected together. The integrated circuits may include application-specific integrated circuits (ASICs), field-programmable gate arrays (FPGAs), or other programmable integrated circuits. Control system 100 may further include one or more memories or storage media to store instructions for carrying out the computations and control functions described herein. Alternatively, control system 100 may be implemented on a general-purpose computer system with proper signal interfaces to communicate with driving unit 140 and motor 150. The computer system includes a storage medium, which stores program instructions. When executing the program instructions, the computer system carries out the computations and control functions described herein.

Figure 5:
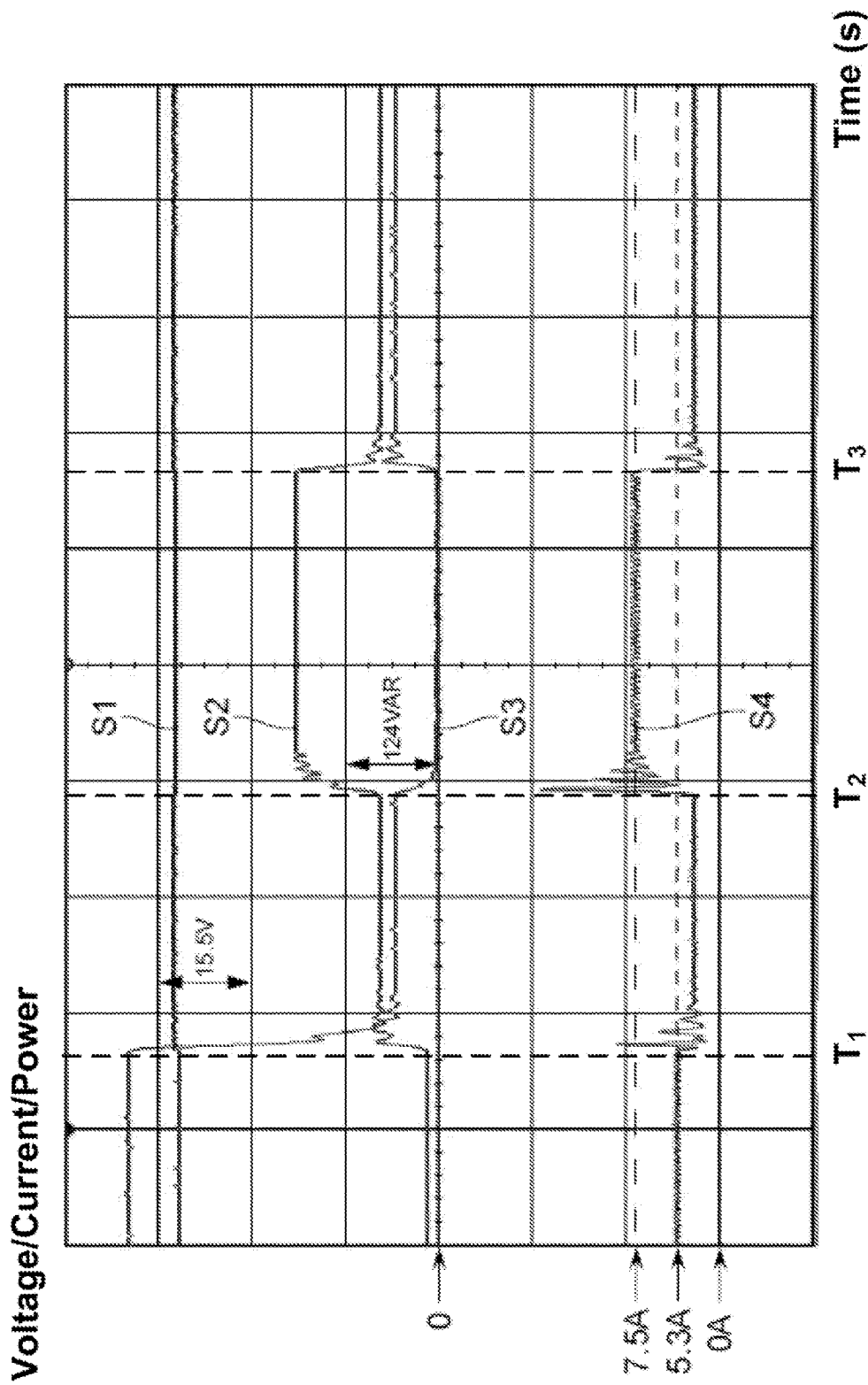
FIG. 5 illustrates a signal diagram of a permanent magnet synchronous motor controlled by a conventional voltage/frequency control technique.
Figure 6:
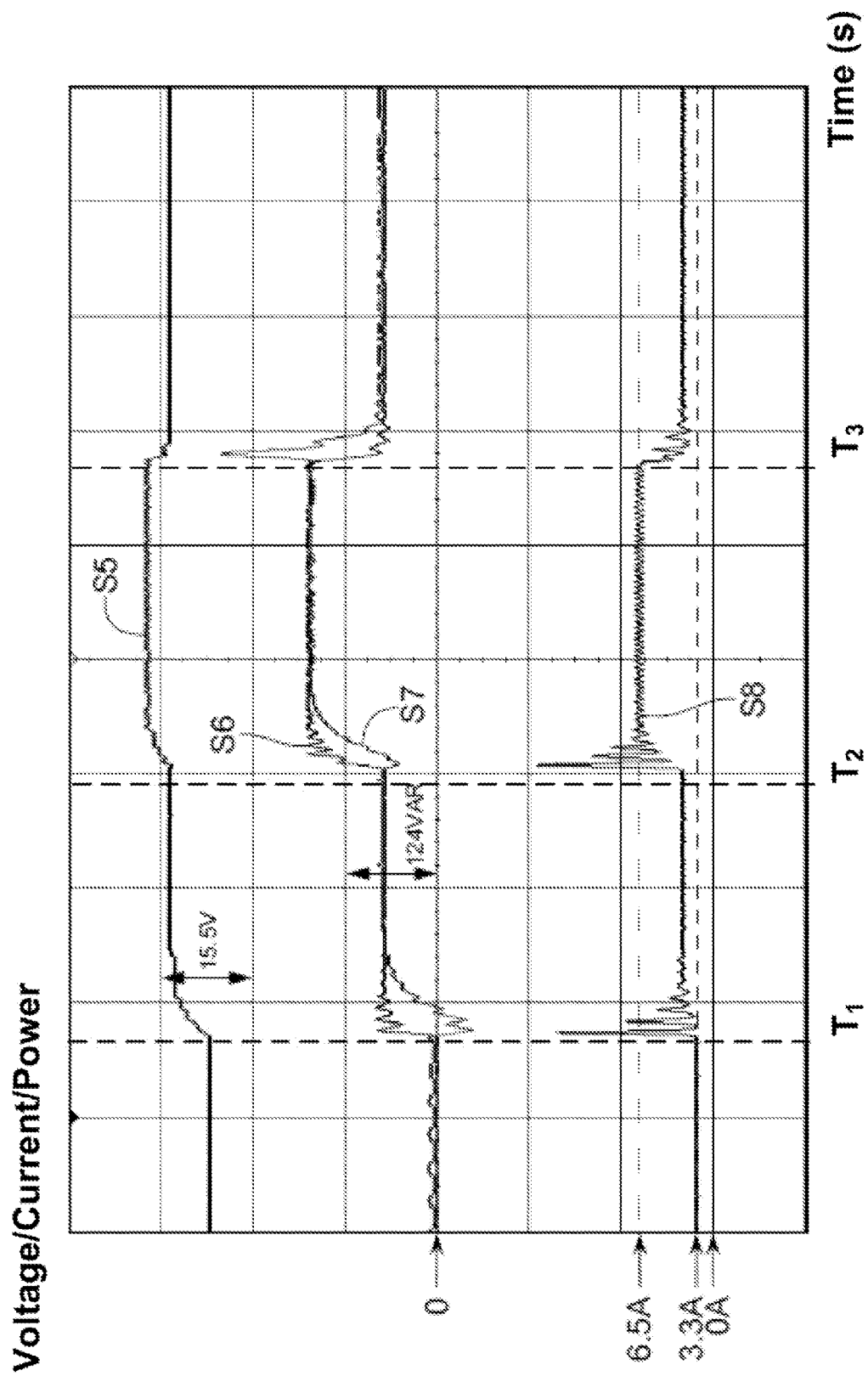
FIG. 6 illustrates a signal diagram of the permanent magnet synchronous motor of FIG. 2, according to an exemplary embodiment.

FIGS. 5 and 6 compare functions of a conventional electric motor control system and the electric motor control system depicted in FIGS. 2-4. Specifically, FIG. 5 shows a signal diagram of the conventional electric motor control system based on a constant voltage/frequency (V/Hz) control method, while FIG. 6 shows a signal diagram of the disclosed motor control system of FIGS. 2-4.

In FIG. 5, S1 represents a driving voltage produced by the conventional electric motor control system. S2 represents an ideal imaginary power of the electric motor when the motor operates in the minimum copper loss condition. S3 represents the imaginary power of the electric motor under the control of the conventional electric motor control system. S4 represents a line current amplitude of the electric motor under the control of the conventional electric motor control system. In FIG. 6, S5 represents a driving voltage produced by the electric motor control system described herein. S6, similarly to S2, represents the ideal imaginary power of the electric motor when the motor operates in the minimum copper loss condition. S7 represents the imaginary power of the electric motor under the control of the electric motor control system described herein. S8 represents the line current amplitude of the electric motor under the control of the electric motor control system describe herein.

In the conventional electric motor control system, as shown in FIG. 5, when there are changes in an external load of the electric motor, e.g., at times T1, T2, and T3, the driving voltage amplitude (S1) remains unchanged, while the imaginary power (S3) of the electric motor deviates from the ideal imaginary power (S2). In addition, the line current amplitude (S4) reaches a relatively high value under each external load. Since the conventional electric motor control system cannot ensure that the imaginary power of the electric motor follows the ideal imaginary power, it cannot control the electric motor to operate in the minimum copper loss condition.

In the electric motor control system described herein, when there are similar changes in the external load of the electric motor, as shown in FIG. 6, the driving voltage amplitude (S5) changes as the external load changes. The imaginary power (S7) of the electric motor follows the ideal imaginary power (S6) such that the electric motor operates substantially in the minimum copper loss condition. In addition, the line current amplitude (S8) of the electric motor reaches a substantially lower value under each external load than that of conventional control system. Accordingly, by using the control system described herein, the electric motor can operates in substantially the minimum copper loss condition under various external loads and causes less copper loss than the conventional motor control system.

Figure 7:
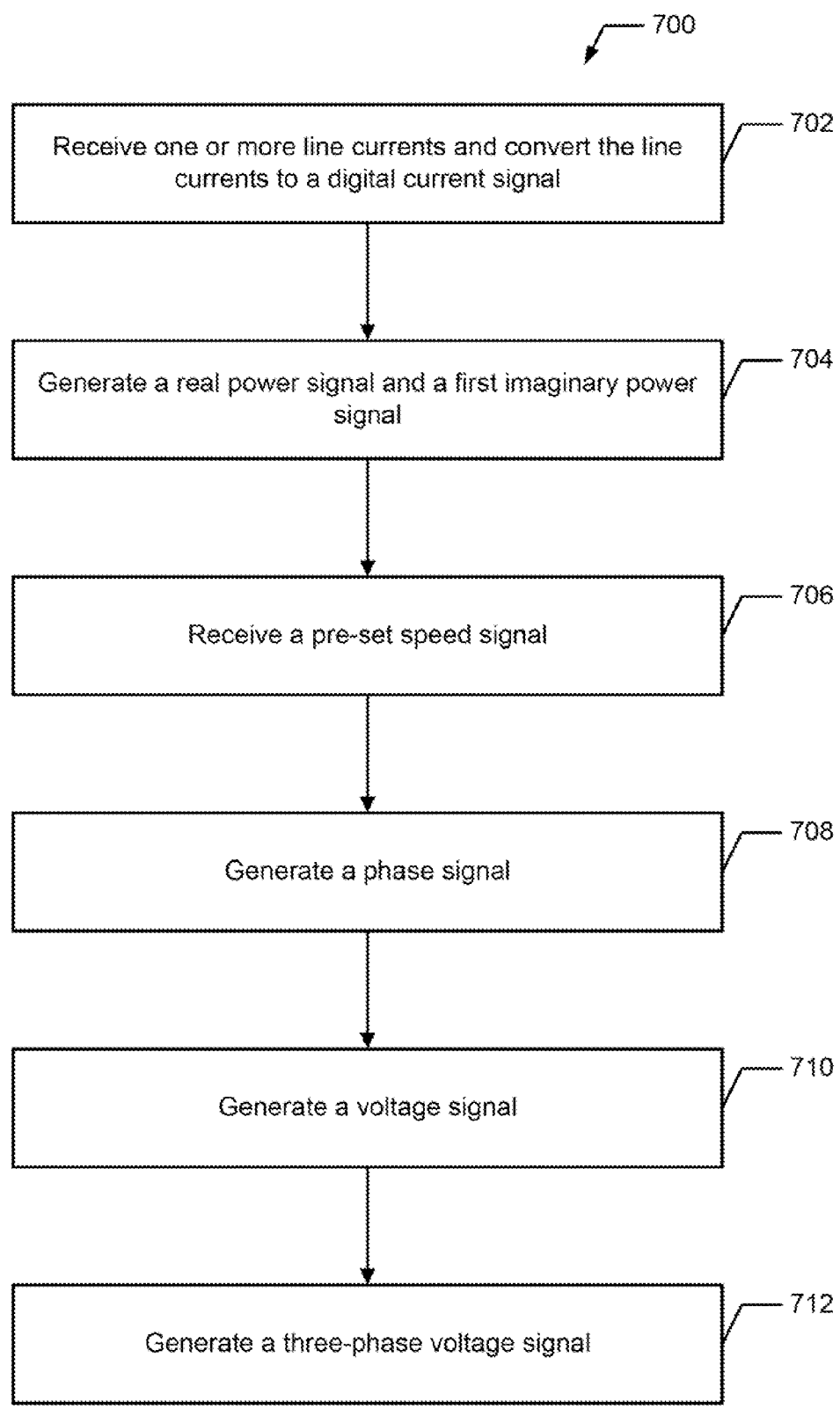
FIG. 7 illustrates a process for controlling a permanent magnet synchronous motor, according to an exemplary embodiment.

FIG. 7 depicts a flow diagram of a process 700 for controlling a PMSM, according to one embodiment. Process 700 may be implemented in the electric motor control system depicted in FIGS. 2-4 and program instructions stored thereon.

According to process 700, at step 702, one or more line currents are received from input lines of an electric motor. The line currents are converted to a digital current signal through an analog-to-digital conversion. At step 704, a digital voltage signal is received from a drive signal generator, which drives the electric motor. According to one embodiment, the digital voltage signal includes a three-phase voltage signal, which includes voltage components on respective lines. According to an alternative embodiment, the digital voltage signal includes one or more of the voltage components of the three-phase voltage signal. A power signal and a first imaginary power signal are generated based on the digital current signal and the digital voltage signal. At step 706, a speed signal, which indicates an expected angular speed of the electric motor, is received through a user input or an external control system.

At step 708, a phase signal is generated based on the speed signal and the power signal. At step 710, a voltage signal is generated based on the speed signal, the power signal, and the first imaginary power signal. At step 712, a three-phase voltage signal is generated for driving the electric motor based on the voltage signal and the phase signal.

Figure 8:
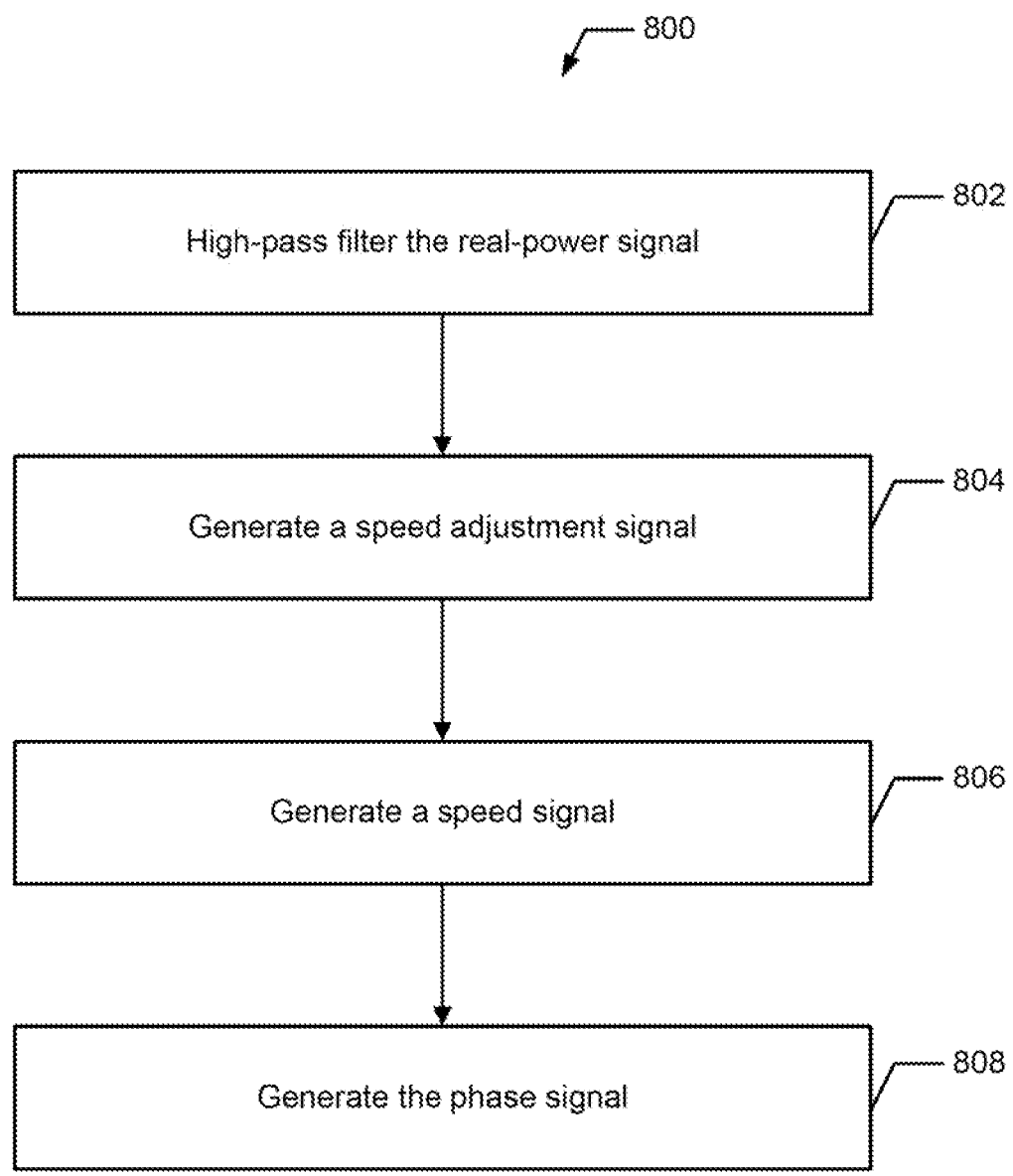
FIG. 8 illustrates a process of step 708 shown in FIG. 7, according to an exemplary embodiment.

FIG. 8 depicts a flow chart of process 800 executed at step 708 of FIG. 7 for generating the phase signal based on the speed signal and the power signal, according to one embodiment. According to process 800, at step 802, the power signal is high-pass filtered to generate a high-pass filtered power signal. At step 804, a speed adjustment signal is generated based on the high-pass filtered power signal. At step 806, a speed signal is generated based on the speed signal and the speed adjustment signal. At step 808, the phase signal is generated by integrating the speed signal.

Figure 9:
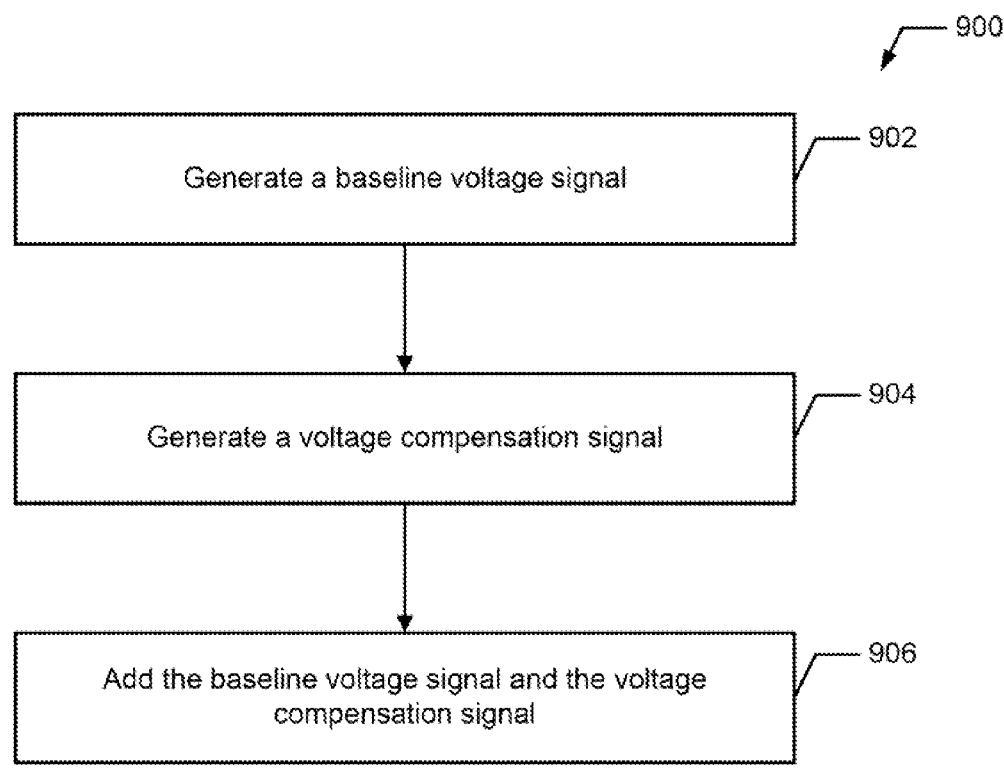
FIG. 9 illustrates a process of step 710 shown in FIG. 7, according to an exemplary embodiment.

FIG. 9 depicts a flow chart of process 900 executed at step 710 of FIG. 7 for generating the voltage signal based on the speed signal, the power signal, and the imaginary power signal. According to process 900, at step 902, a baseline voltage signal is generated based on the speed signal, the maximum line current amplitude, a motor winding resistance value, and a permanent magnetic flux value of the permanent magnet of the electric motor. At step 904, a voltage compensation signal is generated based on the speed signal, the power signal, and the first imaginary power signal. At step 906, the voltage signal is generated by adding the baseline voltage signal to the voltage compensation signal.

Figure 10:
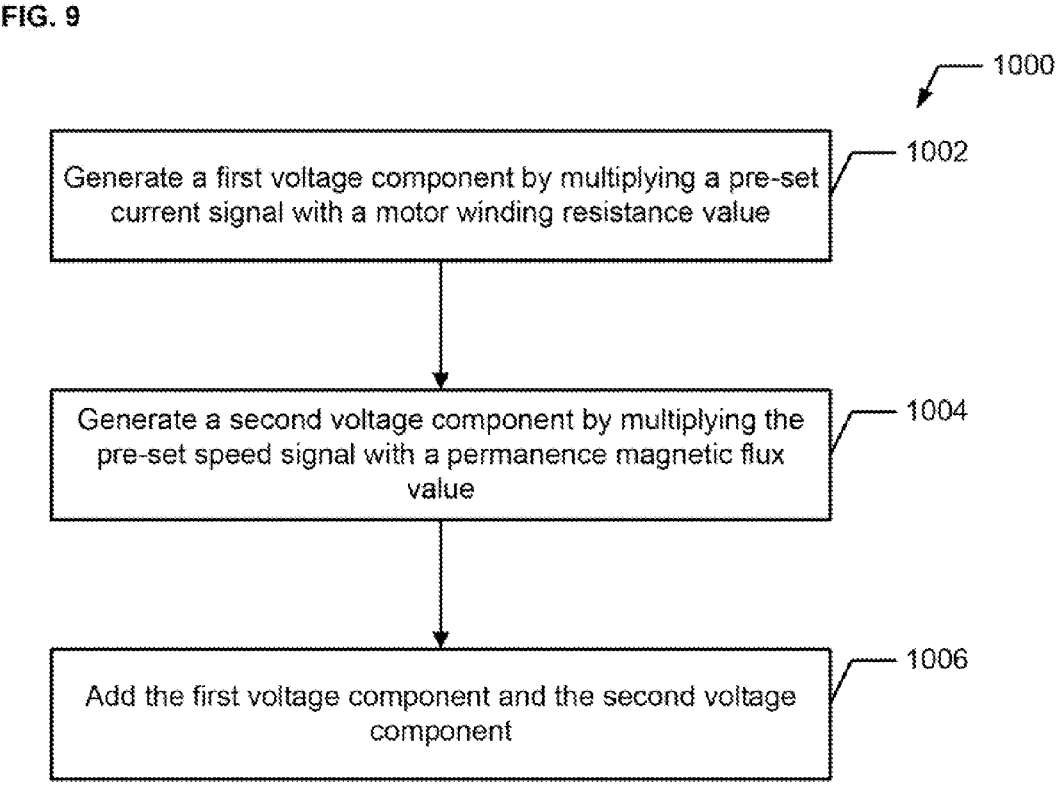
FIG. 10 illustrates a process of step 902 shown in FIG. 9, according to an exemplary embodiment.

FIG. 10 depicts a flow chart of a process 1000 executed at step 902 of FIG. 9 for generating the baseline voltage signal, according to one embodiment. According to FIG. 10, at step 1002, a first voltage component is generated by multiplying the maximum line current amplitude signal with the motor winding resistance value. At step 1004, a second voltage component is generated by multiplying the speed signal with the permanence magnetic flux value. At step 1006, the baseline voltage signal is generated by adding the first and the second voltage components.

Figure 11:
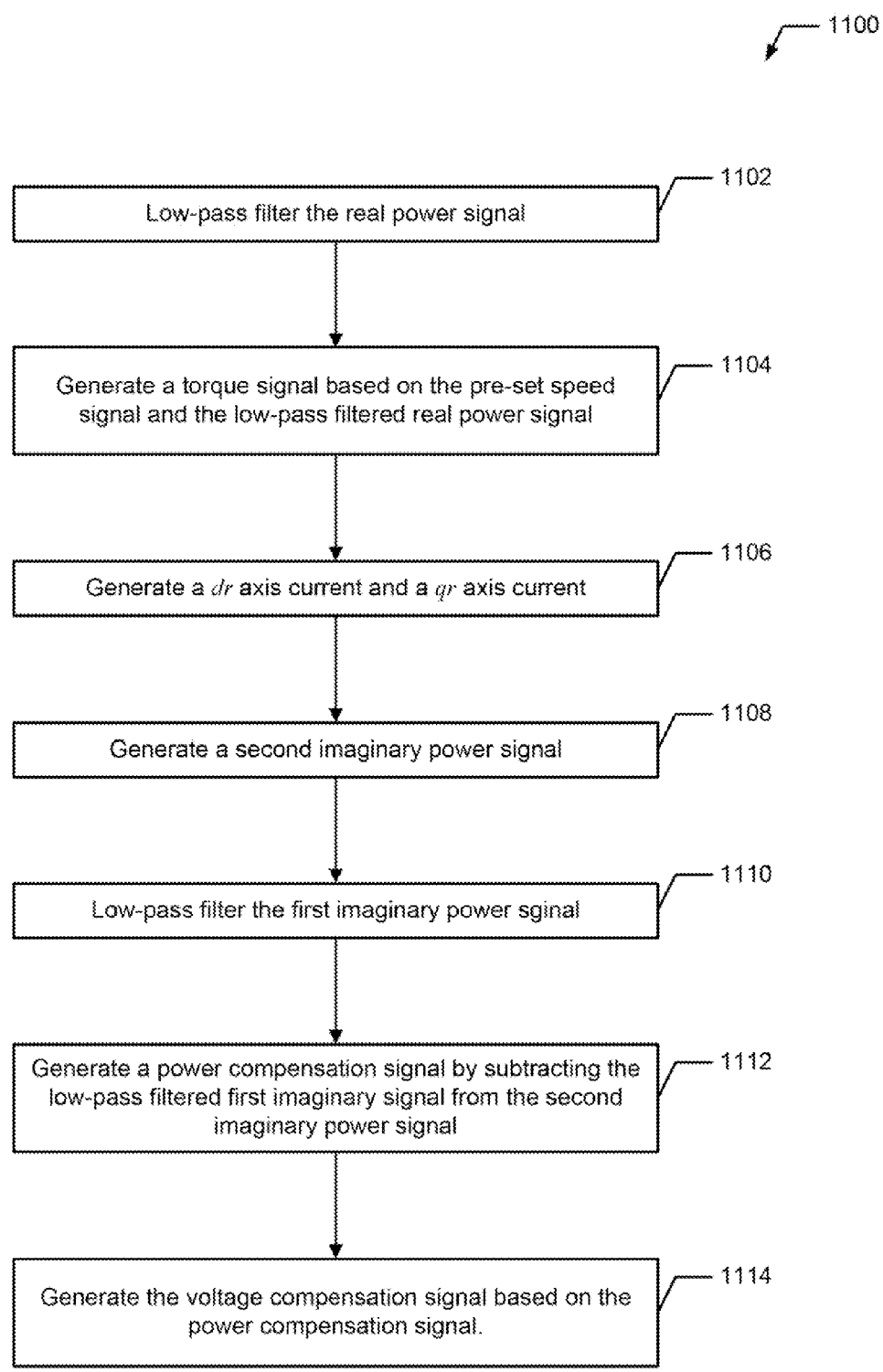
FIG. 11 illustrates a process of step 904 shown in FIG. 9, according to an exemplary embodiment.

FIG. 11 depicts a flow chart of a process 1100 executed at step 904 of FIG. 9 for generating the voltage compensation signal, according to one embodiment. According to FIG. 11, at step 1102, the power signal is low-pass filtered to generate a low-pass filtered power signal. At step 1104, a torque signal is generated based on the speed signal and the low-pass filtered power signal. At step 1106, a dr axis current signal and a qr axis current signal are generated based on the torque signal.

At step 1108, a second imaginary power signal is generated based on the dr axis current signal and the qr axis current signal. At step 1110, the first imaginary power signal is low-pass filtered to generate a low-pass filtered first imaginary power signal. At step 1112, a power compensation signal is generated by subtracting the low-pass filtered first imaginary power signal from the second imaginary power signal. At step 1114, the voltage compensation signal is generated based on the power compensation signal.

Figure 12:
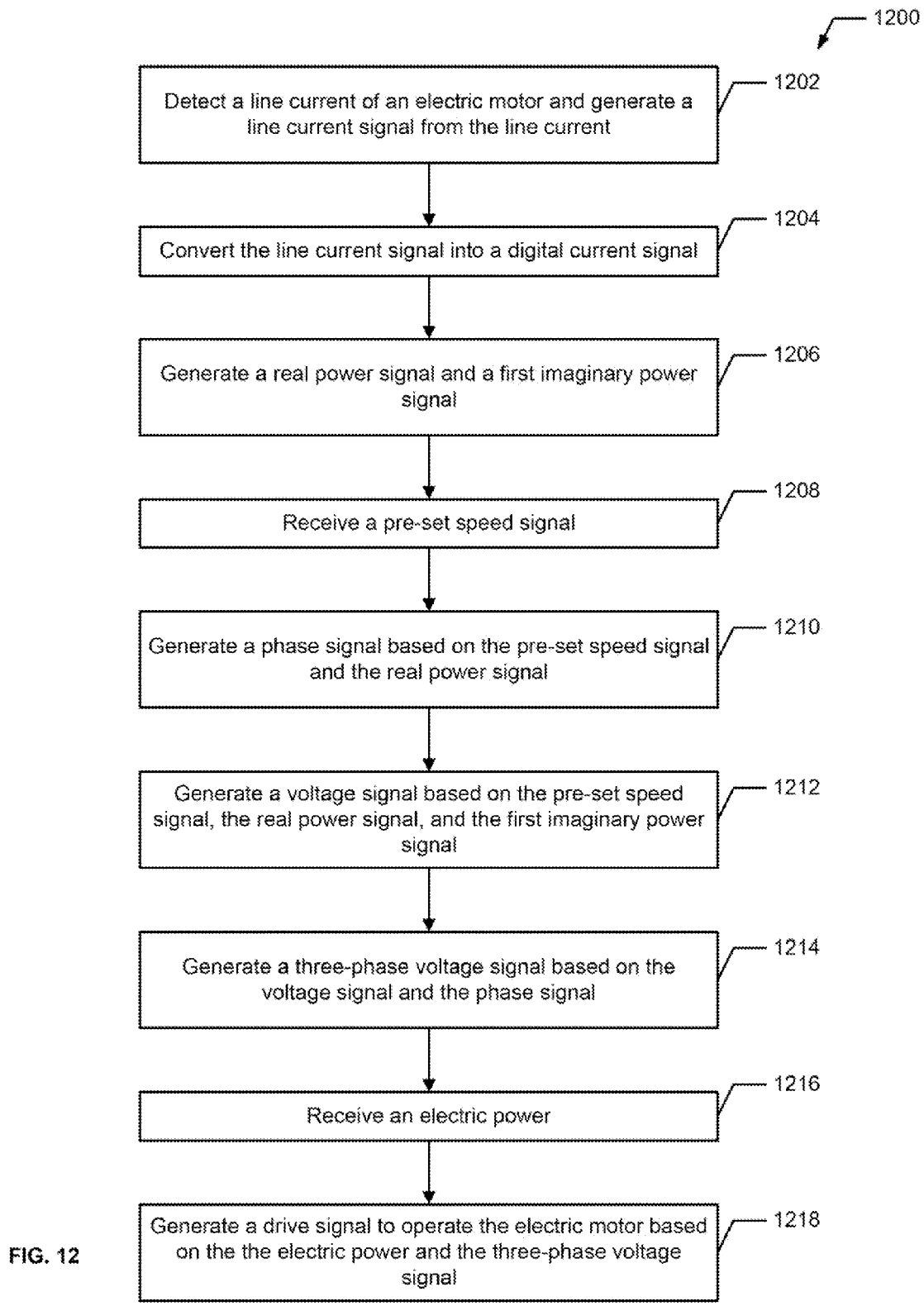
FIG. 12 illustrates a process for controlling a permanent magnet synchronous motor, according to an alternative embodiment.

FIG. 12 depicts a flow chart of process 1200 for controlling an electric motor, according to another embodiment. Process 1200 can be used to control both surface-mounted PMSMs and interior PMSMs. According to process 1200, at step 1202, a line current of the electric motor is detected to generate a line current signal. At step 1204, the line current signal is received from the electric motor and converted to a digital current signal through an analog-to-digital conversion. At step 1206, a power signal and a first imaginary power signal are generated based on the digital current signal and a digital voltage signal, which is used to drive the electric motor.

At step 1208, a speed signal, indicating an expected angular speed of the electric motor, is received. At step 1210, a phase signal is generated based on the speed signal and the power signal. At step 1212, a voltage signal is generated based on the speed signal, the power signal, and the first imaginary power signal. At step 1214, a three-phase voltage signal is generated based on the voltage signal and the phase signal. At step 1216, an electric power is received from an electric power source to power the electric motor. At step 1218, a drive signal is generated to operate the electric motor based on the electric power from the electric power source and the three-phase voltage signal. The drive signal generated according to the processes described herein controls the electric motor to operate in substantially the minimum copper loss condition.

Apparatus and methods are provided for controlling an electric motor. Specifically, a line current signal is generated by detecting a line current from the electric motor. A power signal and an imaginary power signal are generated based on the line current signal. A phase signal is generated based on the power signal and a speed signal indicating an expected angular speed of the electric motor. A voltage signal is generated based on the speed signal, the power signal, and the imaginary power signal. A drive signal is generated based on the phase signal and the voltage signal to operate the electric motor substantially under a minimum copper loss condition. In some embodiments, the disclosed operation may improve the efficiency of the electric motor.

Other variations of the disclosed embodiments will be apparent to those skilled in the art from consideration of the specification and practice of the embodiments disclosed herein. The scope of the claims is intended to cover any variations, uses, or adaptations of the disclosed embodiments following the general principles thereof and including such departures from the present disclosure as come within known or customary practice in the art. It is intended that the specification and examples be considered as exemplary only, with a true scope and spirit of the disclosed embodiments being indicated by the following claims.

It will be appreciated that the disclosed embodiments are not limited to the exact construction that has been described above and illustrated in the accompanying drawings, and that various modifications and changes can be made without departing from the scope thereof.

What is claimed is:

1. A method for controlling a permanent magnet synchronous motor, the method comprising:
    receiving a feedback current from a motor;
    generating a digital current signal based on the feedback current, the digital current signal indicative of a value of the feedback current;
    generating a power signal and a first imaginary power signal based on the digital current signal and a three-phase voltage signal;
    receiving a speed signal indicative of an expected speed of the motor;
    generating a phase signal based on the speed signal and the power signal;
    generating a voltage signal based on the speed signal, the power signal, and the first imaginary power signal; and
    adjusting the three-phase voltage signal for driving the motor based on the voltage signal and the phase signal.

2. The method of claim 1, where the generating of the phase signal based on the speed signal and the power signal further comprises:
    generating a high-pass filtered power signal by high-pass filtering the power signal;
    generating a speed adjustment signal based on the high-pass filtered power signal;
    adjusting the speed signal by subtracting the speed adjustment signal from the speed signal; and
    generating the phase signal by integrating the speed signal.

3. The method of claim 1, wherein the generating of the voltage signal further comprises:
    generating a baseline voltage signal based on the speed signal, a maximum line current amplitude, a motor winding resistance value, and a permanent magnetic flux value;
    generating a voltage compensation signal based on the speed signal, the power signal, and the first imaginary power signal; and
    generating the voltage signal by adding the baseline voltage signal and the voltage compensation signal.

4. The method of claim 3, wherein the generating of the baseline voltage signal further comprises:
    generating a first voltage component by multiplying the maximum line current amplitude and the motor winding resistance value;
    generating a second voltage component by multiplying the speed signal and the permanent magnetic flux value; and
    generating the baseline voltage signal by adding the first voltage component and the second voltage component.

5. The method of claim 3, wherein the generating of the voltage compensation signal further comprises:
    low-pass filtering the power signal;
    generating a torque signal based on the low-pass filtered power signal and the speed signal;
    generating a direct axis current signal and a quadrature axis current signal based on the torque signal;
    generating a second imaginary power signal based on the direct axis current signal and the quadrature axis current signal;

low-pass filtering the first imaginary power signal;
generating a power compensation signal by subtracting the low-pass filtered first imaginary power signal from the second imaginary power signal; and
generating the voltage compensation signal based on the power compensation signal.

6. The method of claim 1, further comprising:
generating the feedback current by measuring a line current of the motor;
receiving an electrical signal from an electrical power source; and
generating a drive signal based on the electrical signal and the three-phase voltage signal.

7. The method of claim 6, wherein the electrical power source includes a direct-current voltage source.

8. The method of claim 1, wherein the motor is a surface-mounted permanent magnet synchronous motor or an interior permanent magnet synchronous motor.

9. The method of claim 1, further comprising generating the current signal by applying an analog-to-digital conversion to the feedback signal.

10. The method of claim 1, wherein a power of the motor approximates an ideal imaginary power of the motor generated in a minimum copper loss condition.

11. An apparatus for controlling a permanent magnet synchronous motor, the apparatus comprising:
an analog-to-digital converter configured to receive a feedback current from a motor and convert the feedback current to a digital current signal;
a first power computation unit, implemented by a processor, coupled to the analog-to-digital converter for receiving the digital current signal and configured to generate a power signal and a first imaginary power signal based on the digital current signal and a three-phase voltage signal;
a speed setting unit, implemented by a processor, configured to generated a speed signal based on an expected angular speed of the motor;
a phase computation unit, implemented by a processor, coupled to the speed setting unit and the first power computation unit for receiving the speed signal and the power signal and configured to generate a phase signal based on the speed signal and the power signal;
a voltage computation unit, implemented by a processor, coupled to the speed setting unit and the first power computation unit for receiving the speed signal, the power signal, and the first imaginary power signal and configured to generate a voltage signal based on the speed signal, the power signal, and the first imaginary power signal; and
a drive signal generator, implemented by a processor, coupled to the voltage computation unit and the phase computation unit for receiving the voltage signal and the phase signal and configured to generate a three-phase voltage signal based on the voltage signal and the phase signal.

12. The apparatus of claim 11, wherein the phase computation unit further comprises:
a high-pass filter receiving the power signal and high-pass filtering the power signal;
a first control unit coupled to the high-pass filter for receiving the high-pass filtered power signal and configured to generate a speed adjustment signal based on the high-pass filtered power signal;
a first subtraction unit coupled to the first control unit for receiving the speed adjustment signal and configured to generate a speed signal by subtracting the speed adjustment signal from the speed signal; and
an integration unit coupled to the first subtraction unit for receiving the speed signal and configured to generate a phase signal by integrating the speed signal.

13. The apparatus of claim 12, wherein the first control unit generates the speed adjustment signal by multiplying the high-pass filtered power signal with a constant value.

14. The apparatus of claim 11, wherein the voltage computation unit further comprises:
a baseline voltage computation unit receiving the speed signal and configured to calculate a baseline voltage signal based on the speed signal, a maximum line current amplitude, a motor winding resistance value of the motor, and a permanent magnetic flux value of the motor;
a voltage compensation computation unit receiving the speed signal, the power signal, and the first imaginary power signal and configured to generate a voltage compensation signal based on the speed signal, the power signal, and the first imaginary power signal; and
a first summation unit coupled to the baseline voltage computation unit and the voltage compensation computation unit for receiving the baseline voltage signal and the voltage compensation signal and configured to generate the voltage signal by adding the baseline voltage signal and the voltage compensation signal.

15. The apparatus of claim 14, wherein the baseline voltage computation unit further comprises:
a first multiplication unit receiving the maximum line current amplitude and the motor winding resistance value and configured to generate a first voltage component by multiplying the maximum line current amplitude and the motor winding resistance value;
a second multiplication unit receiving the speed signal and the permanent magnetic flux value and configured to generate a second voltage component by multiplying the speed signal and the permanent magnetic flux value; and
a second summation unit coupled to the first multiplication unit and the second multiplication unit for receiving the first voltage component and the second voltage component and configured to generate the baseline voltage signal by adding the first voltage component and the second voltage component.

16. The apparatus of claim 14, wherein the voltage compensation computation unit further comprises:
a first low-pass filter receiving the power signal and low-pass filtering the power signal;
a torque computation unit coupled to the first low-pass filter for receiving the low-pass filtered power signal and configured to generate a torque signal based on the speed signal and the low-pass filtered power signal;
a current computation unit coupled to the torque computation unit for receiving the torque signal and configured to generate a direct axis current signal and a quadrature axis current signal based on the torque signal;
a second power computation unit coupled to the current computation unit and configured to generate a second imaginary power based on the direct axis current signal and the quadrature axis current signal;
a second low-pass filter receiving the first imaginary signal and configured to low-pass filter the first imaginary power signal;
a subtraction unit coupled to the second power computation unit and the second low-pass filter and configured to generate a power compensation signal by subtracting the low-pass filtered first imaginary power signal from the second imaginary power signal; and a second control unit coupled to the subtraction unit and configured to generate the voltage compensation signal based on the power compensation signal.

17. The apparatus of claim 16, wherein the second control unit generates the voltage compensation signal by a proportional and integral controller.

18. The apparatus of claim 11, further comprising:

a current sensor configured to measure a line current of the motor and generate the feedback current based on the line current of the motor;

a power source configured to supply an electrical power; and a drive unit coupled to the power source and the drive signal generator and configured to generate a drive signal based on the electrical power and the three-phase voltage signal.

19. The apparatus of claim 18, wherein the motor is a surface-mounted permanent magnet synchronous motor or an interior permanent magnet synchronous motor.

20. A non-transitory computer-readable medium including instructions stored thereon, which, when executed by a processor, cause the processor to carry out a method for controlling a permanent magnet synchronous motor, the method comprising:

generating a digital current signal based on a feedback current received from a motor;

generating a power signal and a first imaginary power signal from the digital current signal and a three-phase voltage signal;

receiving a speed signal indicative of an expected angular speed of the motor;

generating a phase signal based on the speed signal and the power signal;

generating a voltage signal based on the speed signal, the power signal, and the first imaginary power signal; and generating the three-phase voltage signal for driving the motor based on the voltage signal and the phase signal.

* * * * *

UNITED STATES PATENT AND TRADEMARK OFFICE
CERTIFICATE OF CORRECTION

PATENT NO. : 8,618,756 B2  
APPLICATION NO. : 13/477248  
DATED : December 31, 2013  
INVENTOR(S) : Hung et al.

Page 1 of 1

It is certified that error appears in the above-identified patent and that said Letters Patent is hereby corrected as shown below:

In the Claims

Claim 11, Col. 13, Line 38, "configured to generated" should read as --configured to generate--.

Signed and Sealed this  
Second Day of September, 2014

Michelle K. Lee  
*Deputy Director of the United States Patent and Trademark Office*